United States Patent [19]

Petersen

[11] 4,409,194

[45] Oct. 11, 1983

[54] METHOD OF SEPARATING MAGNESIUM FROM WET PROCESS SUPERPHOSPHORIC ACID

[75] Inventor: Alfred W. Petersen, Salt Lake City, Utah

[73] Assignee: Stauffer Chemical Company, Westport, Conn.

[21] Appl. No.: 113,981

[22] Filed: Jan. 21, 1980

Related U.S. Application Data

[63] Continuation of Ser. No. 969,746, Dec. 14, 1978, abandoned.

[51] Int. Cl.$^3$ ............................................. C01B 25/16
[52] U.S. Cl. ................................ 423/321 R; 423/160; 423/315
[58] Field of Search .................... 423/321 R, 320, 160, 423/314, 315

[56] References Cited

U.S. PATENT DOCUMENTS

Re. 29,149  3/1977  Young ................................. 423/317
4,248,843  2/1981  Williams et al. ................. 423/321 R

OTHER PUBLICATIONS

"Phosphoric Acid" Slack, editor, 1968, pp.650–651.

Primary Examiner—Gregory A. Heller
Attorney, Agent, or Firm—Edwin H. Baker

[57] ABSTRACT

A method of separating magnesium from wet process superphosphoric acid by filtration characterized by no or minimizing agitation during the crystallization of the magnesium in order to form readily filterable agglomerates of $MgH_2P_2O_7$.

2 Claims, 1 Drawing Figure

METHOD OF SEPARATING MAGNESIUM FROM WET PROCESS SUPERPHOSPHORIC ACID

This is a continuation of application Ser. No. 969,746, filed Dec. 14, 1978 now abandoned.

BACKGROUND OF THE INVENTION

This invention relates to the treatment of superphosphoric acid and more particularly refers to an improved process for removing magnesium from wet process superphosphoric acid.

Wet process phosphoric acid is conventionally prepared by reacting sulfuric acid and phosphate rock, followed by filtration to remove the insoluble gypsum and other insoluble compounds. The resultant dilute or weak phosphoric acid containing about 26 to 30 percent $P_2O_5$ by weight is commonly known as "filter" acid and is a highly impure material containing dissolved sulfates, fluosilicates, and salts of iron, aluminum, magnesium, sodium and other metals. These impurities may precipitate and settle out in varying rates and amounts during storage or further processing of the dilute wet process phosphoric acid.

Concentration of dilute or weak wet-process phosphoric acid up to the super range containing 64 to 72 percent $P_2O_5$ is done in two steps. Preferably this two step concentration is done in separate equipment because of variation in temperature, corrosion and viscosity that occur through the total range.

As a first step, it is common to evaporate said dilute or weak acid and to partially purify said acid by removal of precipitated impurities consisting of $CaSO_4$, $Na_2SiF_6$, $(Fe, Al)_3 KH_{14}(PO_4)_8 \cdot 4H_2O$ and other salts to a concentration of about 38 to about 56 weight percent $P_2O_5$. This acid is known as "evaporator" acid with about 54 percent $P_2O_5$ being most common. It is difficult to remove magnesium at this stage due to the high solubility of magnesium salts.

As a second step, the partially purified evaporated acid (38 to 56 weight percent $P_2O_5$) is further evaporated to superphosphoric acid containing about 64 to 72 weight percent $P_2O_5$. Impurities that precipitate in the production of the superphosphoric acid consist of $MgH_2P_2O_7$, $FeH_2P_3O_{10}$, $AlH_2P_3O_{10}$ and other salts. Filtration of superphosphoric acid removes a portion of the magnesium, iron, and aluminum impurities, but such filtration of the superphosphoric acid is a difficult and slow process. The filtration rate is very slow, due to the high viscosity of the superphosphoric acid and the small crystals that have dimensions in the range of 1 to 15 microns.

Liquid ammonium phosphate fertilizer solutions are derived from wet process phosphoric acid. Said solutions, commonly 10-34-0 grade (10 weight percent N, 34 weight percent $P_2O_5$, and 0 weight percent $K_2O$), are prepared either (1) by reacting superphosphoric acid containing 64–72 percent $P_2O_5$ with liquid and/or gaseous ammonia or (2) by reacting acid containing 54 to 60 weight percent $P_2O_5$ with gaseous ammonia. Magnesium is a particularly troublesome impurity in such prepared liquid ammonium fertilizer solution because it slowly precipitates as $Mg(NH_4)_2P_2O_7 \cdot 4H_2O$ or as $MgNH_4PO_4 \cdot 6H_2O$. The settling of these precipitates results in sludge losses in storage tanks or plugging of handling equipment.

Various prior art methods have previously been proposed for limiting precipitation of the magnesium salts or for removing magnesium from phosphates.

One method, described in U.S. Pat. No. 3,632,329, teaches a method for preventing post-precipitation of magnesium salt from ammonium phosphate fertilizer base solutions prepared from wet superphosphoric acid by the accelerated precipitation of $Mg(NH_4)_2P_2O_7 \cdot 4H_2O$. The method comprises continuous agitation of said solution concurrently with seeding at specified temperatures and pH followed by separation of the precipitated magnesium sludge.

A second method, described in U.S. Pat. No. 3,554,728, teaches the accelerated precipitation of $Mg(NH_4)_2P_2O_7 \cdot 4H_2O$ in said solutions by means of overammoniation to high $N/P_2O_5$ ratio followed by separation of the sludge and adjustment back to the desired $N/P_2O_5$ ratio.

The disadvantage of these methods is that disposal or by-product use of the magnesium sludge containing valuable fertilizer $P_2O_5$ and N can be very costly.

A third method, described in U.S. Pat. No. 3,642,439, involves forming a precipitate of a magnesium-aluminum-fluoride-phosphate complex compound from phosphoric acid. The process involves the following steps:

(a) evaporating the weak phosphoric acid at a temperature of 85°–100° C. at a pressure below atmospheric to a concentration of 45–53 weight percent $P_2O_5$, preferably 47–51 weight percent $P_2O_5$, whereby the $H_2SiF_6$ content of the acid is reduced and the hydrogen fluoride content is increased;

(b) maintaining the hydrogen fluoride content of the concentrated phosphoric acid at F/MgO weight ratio of at least 2.2, preferably between 3 and 12;

(c) maintaining the soluble aluminum content of the concentrated phosphoric acid, measured as $Al_2O_3$, at an $Al_2O_3$/MgO weight ratio of at least 1.4, preferably between about 3 and 12;

(d) maintaining the concentrated phosphoric acid at 50°–100° C. for 15–40 hours to form a precipitate comprising a crystalline filterable magnesium-aluminum-fluoride-phosphate complex compound; and (e) separating the precipitate from the purified concentrated phosphoric acid. The additives required for this process are costly.

A fourth method, described in U.S. Pat. No. 3,711,268, relates to adding a soluble fluorine compound to ammoniated superphosphoric acid to partially precipitate the magnesium impurities or partly stabilize the liquid. This method has the drawback that the fluoride reagent is very costly. A similar method utilizes less costly 23 percent by weight $H_2SiF_6$ to precipitate $MgSiF_6 \cdot 6H_2O$ from phosphoric acid, but costs are still relatively high considering dilution cost and cost of $H_2SiF_6$.

Another method involves pretreating phosphate ore prior to conventional sulfuric acid leaching by leaching with an acidic solution to dissolve the magnesium impurities. But many phosphate rocks cannot be leached to a sufficiently low magnesium content.

The process of the present invention overcomes the shortcomings of prior art processes for removing magnesium from superphosphoric acid.

SUMMARY OF THE INVENTION

An object of the present invention is the efficient and economical separation of magnesium from wet process superphosphoric acid. Another object of the invention is the growth in the superphosphoric acid of magnesium-containing crystals that are easily separable. A further object of the invention is the production of a purified wet process superphosphoric acid by the removal of a substantial portion of the magnesium from said acid.

It has been discovered that it is possible to precipitate magnesium from wet process superphosphoric acid in the form of crystal agglomerates that are easily separated by filtration by the process herein described. The magnesium compound in the crystal agglomerates is $MgH_2P_2O_7$.

DETAILED DESCRIPTION OF THE INVENTION

This invention is directed to a process for separating magnesium from wet process superphosphoric acid.

Firstly, wet process superphosphoric acid containing (1) about 62 to about 72 percent by weight $P_2O_5$ with about 10 to about 45 percent, more preferably with about 25 to about 35 percent of the $P_2O_5$ in polyphosphate form, and (2) about 0.5 to about 3.0 percent by weight MgO is aged under time and agitation conditions hereinafter specified.

The acid is aged for about 4 to about 180 hours, more preferably about 8 to about 36 hours at a temperature of about 85° to about 180° C., more preferably about 105° to about 140° C. at atmospheric pressure. During the aging step, it has been found critical that no agitation or "intermittent agitation" of the superphosphoric acid should occur.

By the term "intermittent agitation", it is meant that agitation of the aging acid should occur at least once for up to about 50 percent of the aging time period. Preferably a time period of such agitation at least once for about 2 to about 30 minutes per 8 hours of aging should occur or in other words such agitation should occur preferably for about 0.4 to about 6 percent of the aging time period.

Although no agitation works as well as intermittent agitation, it has been found not practical in a commercial plant due to some settling of sludge in the aging vessel. Intermittent agitation gives a filtration rate almost as large as with no agitation and does not allow settling of sludge in the aging vessel.

Any type intermittent agitation can be used, such as sparging or stirring. Although any type stirring is operative, stirring at a low shear rate is preferred.

The aging step can be either a batch or continuous operation.

Secondly, such aged superphosphoric acid is filtered by conventional means at any filterable temperature preferably about 85°–180° C., more preferably at about 100° to about 130° C.

Aging of the acid under the above conditions causes crystallization of magnesium as $MgH_2P_2O_7$ and with intermittent agitation prevents sludge from settling in the aging vessel. Thus, a maximum filtration rate of such aged superphosphoric acid is achieved. No or intermittent agitation yields a greater filtration rate than continuous agitation, that is, agitation for 100 percent of the aging time. Generally, the more agitation time employed the lower the filtration rate for the aged superphosphoric acid.

Any conventional means of filtration can be used. Preferably a rotary vacuum pre-coat filter.

Preferably a coarse-grade diatomaceous earth filter aid is used in the filtration step as a pre-coat on the filter media.

EXAMPLE I

Figure 1:
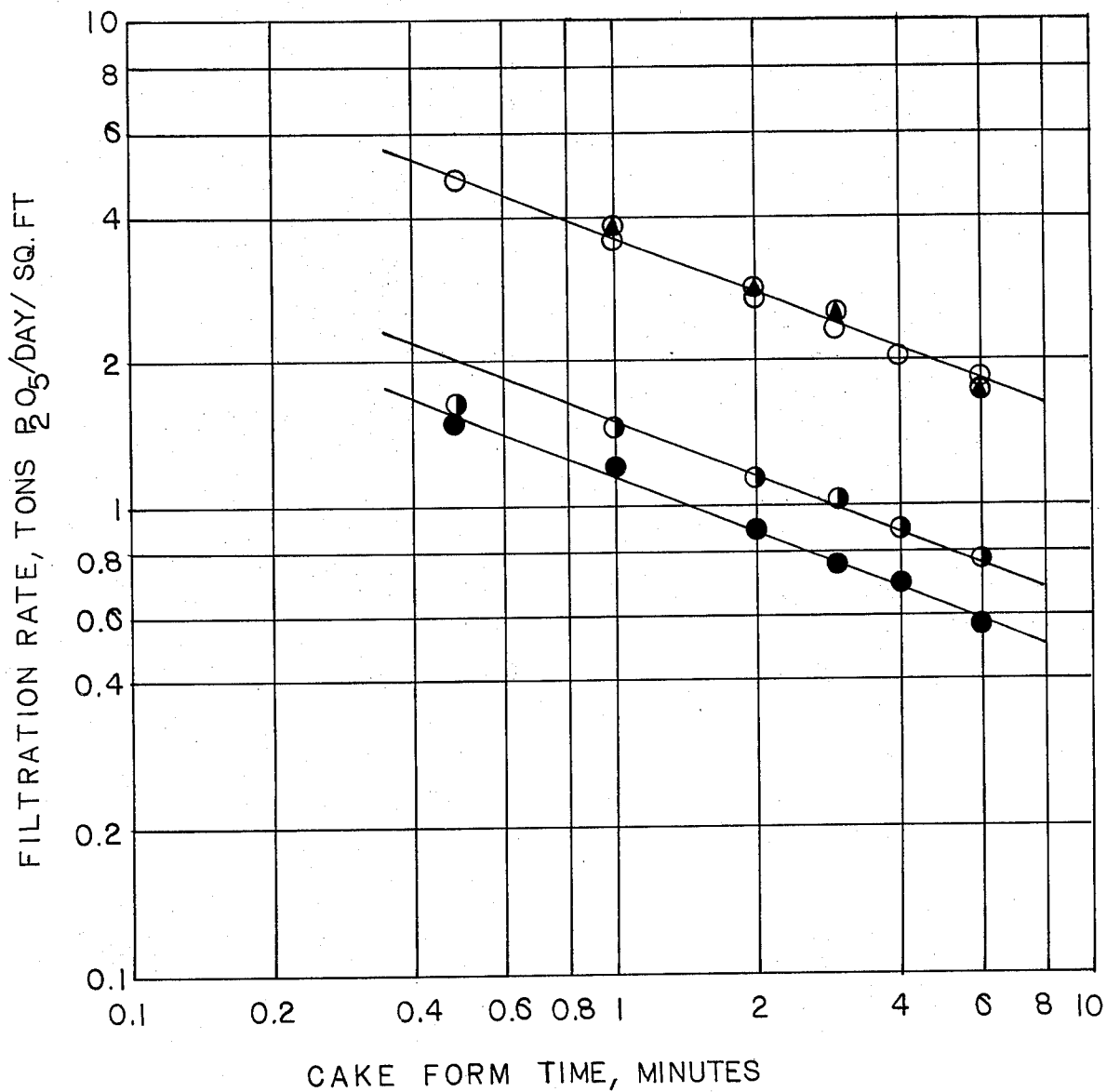
FIG. 1 is the plot of the filtration rates of four samples of freshly produced, unfiltered superphosphoric acid prepared according to Example I vs. the cake form time in minutes. One sample was no agitation during the aging step. The second sample was given intermittent agitation. The remaining two samples were continuously agitated with a slow rake and with a moderate speed turbine.

The phosphate rock used in this example was obtained from typical mining operations in the Western United States. The rock was acidulated with $H_2SO_4$ by the conventional wet process. The dilute phosphoric acid produced was evaporated to about 51 percent $P_2O_5$ and immediately centrifuged to remove a substantial portion of the solids present. The acid containing about 51 percent $P_2O_5$ was further concentrated by evaporation to yield superphosphoric acid containing 68.2 percent $P_2O_5$, 28 percent of the $P_2O_5$ being in polyphosphate form, 1.02 percent MgO, 1.43 percent $Fe_2O_3$, 2.62 percent $Al_2O_3$, 4.62 percent $H_2SO_4$ and 0.38 percent F.

A portion of the freshly-produced superphosphoric acid was filtered, with the filtrate analyzing 1.01 percent MgO. This example teaches that most of the magnesium present in the freshly-produced superphosphoric acid is in soluble form.

EXAMPLE II

Four portions of the freshly-produced, unfiltered superphosphoric acid from Example I were subjected to aging at 118° C., each under a different condition of agitation. The aging times were varied somewhat in order to achieve nearly the same percent MgO in the final filtrate. This enables one to compare the filtration rates on an equal basis. At the end of each aging period, about half of the soluble magnesium had crystallized as $MgH_2P_2O_7$. The acid portions were filtered at 23 inches Hg vacuum and 118° C. in a Buchner funnel using a one-half inch of a coarse grade diatomaceous earth filter aid. The funnel and filter aid had previously been prepared by saturating the filter aid with a superphosphoric acid filtrate free of solids and equilibrating at 118° C. As the aged superphosphoric acid filtered, the $MgH_2P_2O_7$ cake formed on top of the filter aid. The filtration rate achieved vs. cake form time is plotted in FIG. 1.

As can be seen, the lowest filtration rate was obtained with continuous moderate turbine agitation. Also, as can be seen, a continuous slow rake somewhat improves the filtration rate. In contrast, as can be seen, a substantial improvement in filtration rate was achieved by utilizing no agitation during aging and when intermittent agitation for 5 minutes per 8 hours was utilized a filtration rate indistinguishable from the no agitation filtration rate was obtained.

What is claimed:

1. A process for separating soluble magnesium from wet process superphosphoric acid containing (1) about 62 to about 72 percent by weight $P_2O_5$ with about 10 to about 45 percent of the $P_2O_5$ in polyphosphate form, and (2) about 0.5 to about 3.0 pecent by weight MgO comprising the steps of aging said acid from about 4 to about 180 hours at a temperature of about 85° to about 180° C. with intermittent agitation of about 0.4 to about 50 percent of the aging time period followed by the step of filtering the aged superphosphoric acid at a temperature of about 85° to about 180° C.

2. The process of claim 1 wherein said wet process superphosphoric acid contains about 25 to about 35 percent of the $P_2O_5$ in polyphosphate form and said aging step is carried out at a temperature of about 105° to about 140° C. and the agitation should occur for about 0.4 to about 6 percent of the aging time.

* * * * *